June 6, 1950          J. A. BRUCE          2,510,679
CITRUS FRUIT PROCESSING
Filed Sept. 19, 1946
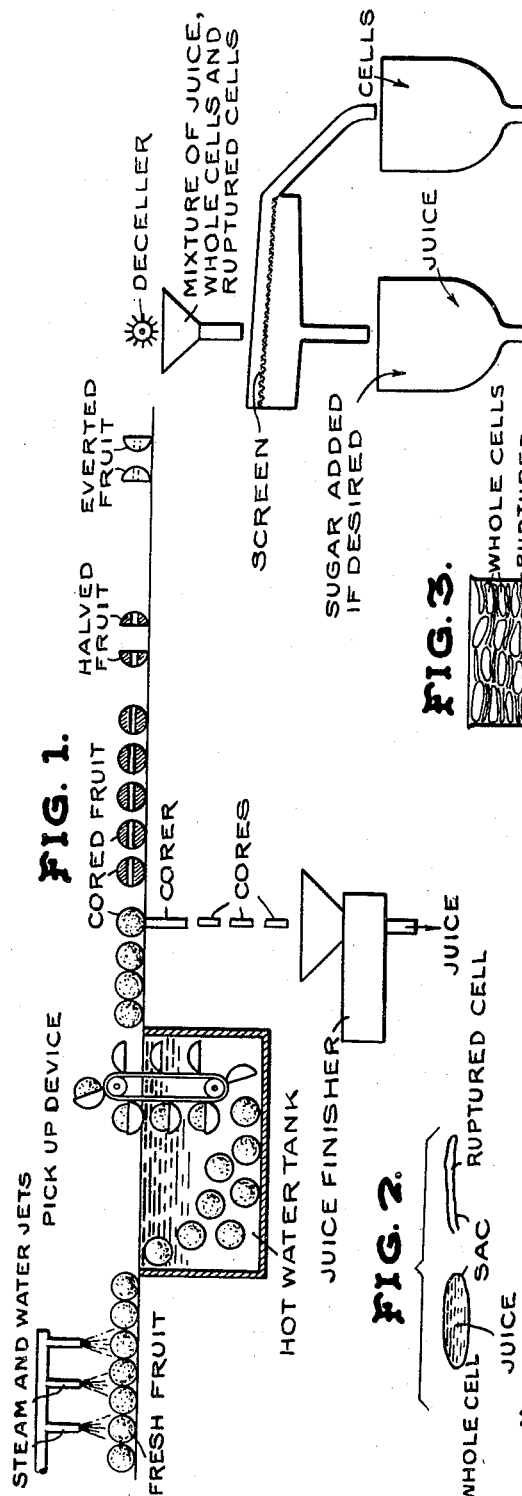
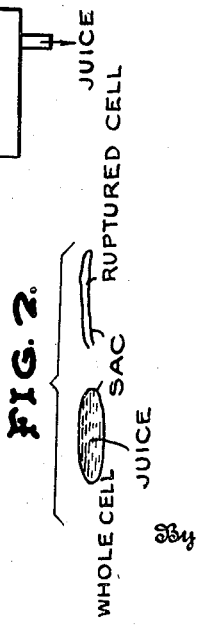
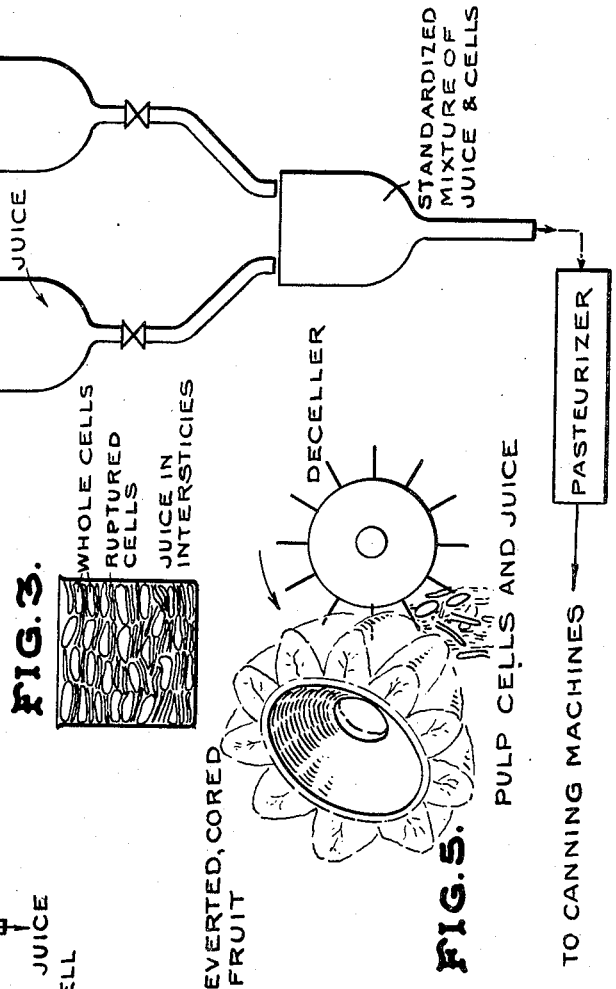
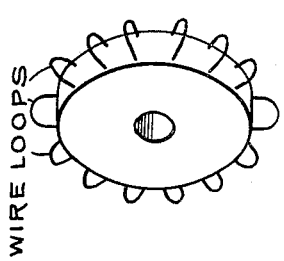
Inventor
JOHN A. BRUCE
By
Frederick H. Unstreet
Attorney Patented June 6, 1950

2,510,679

UNITED STATES PATENT OFFICE 2,510,679

CITRUS FRUIT PROCESSING

John A. Bruce, Tampa, Fla.

Application September 19, 1946, Serial No. 697,968

12 Claims. (Cl. 99—155)

This invention relates to citrus fruits, including grapefruit, oranges, lemons and limes, and is directed to a novel process for converting such fruits into new types of products.

The process is characterized by the fact that the meat of citrus fruits is disintegrated and extracted so as to preserve a substantial portion of the meat cells whole and with their juice retained therein. The rest of the cells are ruptured to free the juice during extraction. The whole cells and the ruptured cells are combined with the juice in appropriate proportions to form a novel mixed product of homogeneous character, which differs materially in appearance and characteristics from conventional canned citrus juices. Such product is relatively economical to produce and may be used for many purposes as a substitute for the more expensive canned citrus meat segments as well as being useful for purposes where segments would not be appropriate.

Citrus fruit, such as oranges, grapefruit and lemons, is composed of an outer rind or peel and an inner meat formed in wedge-shaped segments which are separated one from another by a fibrous layer or wall commonly referred to as "rag." The meat segments are substantially composed of citrus fruit "cells." These are elongated or oval-shaped sacs containing the citrus juice. In each segment of pulp the cells are closely packed together to form a firm, self-supporting mass of fruit cells.

Large quantities of citrus fruits are processed for the preparation of products which may be sold in cans, as canned fruit juice or as canned "segments." A fairly substantial quantity of grapefruit is sold as canned grapefruit segments. In segmentizing grapefruit the rind is cut off by hand and the segments separated. Operatives then fill cans with these individual segments. This is an expensive operation, a premium must be paid for selected fruit, there is considerable industrial hazard attached to the process due to dermatitis, and because of the costs of making such canned products the segments must sell at a high premium which in turn lessens consumer demand.

When the fruit is to be processed for the preparation of a canned juice one customary procedure is to halve the fruit by means of a knife cutting the fruit transverse the core; then the halved fruit is subjected to the action of a rotating burr, or a squeezing device of some kind, which is designed to break down the fruit "meat" completely. This ruptures and defibrinates the individual fruit cells of the meat so that the juice therein can be liberated to the fullest possible extent. The mixture flowing from the burring or juice-extracting operation thus consists of a mixture of juice, rag, seeds, and a more or less small amount of broken-down cell sacs, the remainder of the cell sacs adhering to, or remaining with the rind. These cell sacs can be defined as the sacs which originally contained the juice, "whole cells" being defined as the cell sac containing the juice.

The juice mixture must, of course, be screened to free it from insoluble solids. Consequently, it is filtered or otherwise clarified to remove the filterable constituents to yield a juice which, although cloudy, contains no settable solids. The insoluble solids filtered out, which consist of a mixture of rag, seeds, disintegrated cell sacs and portions of the inner rind of the fruit, are usually dried to form what is known as a "meal" which is useful as a fertilizer, animal feed stock, and the like.

The resulting "clear" juice is then sweetened, if desired, pasteurized, and packed in cans. Within recent years much of this juice has been concentrated to yield concentrates which can be reconstituted with water. In other instances the juice has been dehydrated to the point where a solid product is obtained. See, for example, my U. S. Patent 2,366,591.

Thus, on the one hand, the bulk of citrus fruit processing has been directed to obtaining a juice suitable for canning or further processing, and on the other hand to the canning, on a markedly lower scale, of grapefruit segments. These are the two major products of citrus fruit processing.

Of late some attempt has been made to make citrus fruit products containing a portion of the disintegrated cell sacs, i. e. cell fragments. The cell sacs are nutritious and valuable food constituents. By the use of suitable screens the juice flowing from the burring operation mentioned above can be separated into a juice containing insoluble solids composed of the broken-down cell sacs, and a residue of solid material composed of seeds and rags. Because of the nature of the burring operation the whole cells are substantially disintegrated into fragments of small particle size; indeed this is the object of the operation since what is desired is as much juice as possible.

Other workers in this art have recognized the values inherent in such broken-down cell sacs and, as stated, have attempted to prepare commercially satisfactory citrus juice products containing these insoluble solids. A review of the prior art reveals that others have added colloidal agents to such suspensions of juice and disintegrated cell sacs for the purpose of maintaining the cell sac fragments in suspension. This is accomplished by the addition of such substances as gelatin and pectins and these colloidal agents act as suspension agents for holding the cell sac fragments in suspension. It is, of course, obvious that in order to accomplish the desired result the cell sacs must be broken down to fine particle size as much as possible since the finer the particle the more readily is it suspended in the continuous phase of fruit juice.

In effect then, this line of attack on the problem of preparing a citrus fruit product containing the desirable broken-down cell sacs has been directed toward the use of added materials of colloidal nature functioning as protective colloids to prevent settling of the insoluble solids.

It is, of course, obvious that the addition of suspending agents, such as gelatin, or pectins, for the purpose of suspending finely divided solid is not too attractive commercially. Besides, the ultimate finished product does not have eye appeal for the consumer and it is in effect nothing more than a citrus juice containing finely divided insoluble solid material.

I have now set myself to the problem of preparing novel citrus fruit products containing the constituents of the segments, that is, a "whole meat" citrus fruit product. I have had for an object of my researches processes of preparing a citrus fruit product having characteristics markedly different from those hitherto described in the prior art. What I have aimed for is ways of making a product which has consumer appeal, which contains all of the nutritious elements of the meat but which is free of seeds and "rag," and which can be utilized in many different ways as a foodstuff.

Prior practice has been faced with a dilemma; either the juice has to be strained wholly free of cell residues or fragments, or the cell sacs must be so completely pulverized that they can be stabilized against separation by adding colloidal stabilizing agents. Accordingly, I have completely departed from any of these teachings of the prior art.

I have discovered that the "meat" disposed between the "rag" walls of the citrus fruit can be "de-celled" or disintegrated to yield a mixture of citrus juice, whole cells having unchanged physical form, and cells which have been ruptured, but only to the extent necessary to liberate the juice therein. The operation is such as to disintegrate the meat into small components with rupture of only a portion of the meat cells and preservation of a substantial further portion of the meat cells of the fruit intact and containing their juice. This de-celling operation on the meat segments or meat is thus markedly different from the drastic burring operation of the prior art. In my process I do not extract all of the available juice because I want to isolate individual, intact whole cells still having their juice content, and individual ruptured cells (the cell sacs) in which the physical form thereof has been unchanged apart from the ruptures therein. Fragmentation of the cell sacs is, consequently, avoided. The result is a homogeneous mixture of juice, whole cells and ruptured cells which on filtering yields a mixture of whole cells and ruptured cells and a filtrate composed of the citrus juice. I have further discovered that the mass of whole cells and ruptured cells can be recombined with the juice, which may first be sweetened, in volumetric proportions yielding a mixture in which the apparent volume, as for example, viewed through a glass container, is occupied by whole cells and ruptured cells with the juice filling the interstices between the insoluble cells.

By practicing the present process the "suspension" of whole cells and ruptured cells in the continuous juice phase is, I have discovered, substantially stable. It is a kind of mush or pulp in which any tendency for the solid insoluble constituents to segregate is prevented by the physical characteristics of these whole cells and ruptured cells. They are unable to segregate because they mechanically impede one another. Many of them are in contact with adjacent cells. Although the mixture itself is readily flowable and pourable, nevertheless, because the whole cells and ruptured cells are large no segregation, such as to form a fluid layer substantially free of cells, will occur. This physical effect is due to cooperative relationship set up between the whole cells and the ruptured cells. There should be substantial amounts of whole cells present, advantageously from 20 percent to fifty percent of the cell mixture or a ratio of whole cells to ruptured cells of from about 1:1 to 1:4. These whole cells are bulky and full of juice. They constitute a kind of large size "aggregate" with which the limpid ruptured cells are mixed as a smaller aggregate.

This product is a new concept in citrus fruit processing. It is made by processes entirely opposed to prior practices which had for their very object the complete breakdown of the cell structure of the individual cells in the pulp or meat, and did not consider the recovery of the whole cells and ruptured cells as an essential function of the operation nor the maintenance of whole cells as desirable to their purpose.

In order that my invention may be more fully understood I have illustrated my process in flow sheet form on the appended sheet of drawings. In the drawings:

Figure 1 is a flow sheet in substantially diagrammatic form of the process, Figure 2 indicates the approximate shape of the whole cells and limpid ruptured cells as expanded and extracted during the de-celling operation, Figure 3 illustrates a container in which the apparent volume thereof is occupied by the mixture of whole cells and ruptured cells, with the juice filling the interstices between the whole cells and ruptured cells as made in accordance with my process. Figure 4 shows a suitable "de-celling wheel" which is rotated against the fruit segments as I shall more fully describe, and Figure 5 shows this wheel in action against an "everted" cored grapefruit half.

Referring to Figure 1 the fresh citrus fruit, such as grapefruit, oranges, lemons, or limes is first subjected to a preliminary washing and peel-softening treatment by spraying the fruit with steam and water jets. The primary function of this is to clean the fruit, and secondarily, to soften the peel somewhat. Then the fruit is conveyed to a hot water tank maintained at about 180° F. The fruit passes through this hot water tank either on a conveyor or by gravity flow to the other end thereof where it is picked up and conveyed to a coring device. The time of immersion in the hot water tank is advantageously about 5 minutes but this can vary in accordance with the fruit treated, the characteristics of the peel, etc. If the peel is especially hard a longer treatment in the hot water tank may be indicated. In the hot water tank the peel is softened. This makes it possible for a halved fruit to be "everted" as I shall presently describe, without cracking the peel. The hot water treatment may also advantageously soften the "meat" to enable it to be de-celled in a manner to secure recovery of a portion of the meat without rupture as whole cells. The temperature of this bath is not critical but the nearer it is to the boiling point the less will be the time of immersion of the fruit therein. Temperatures of 150° F.–200° F. are usually employed.

After immersion in the hot water tank the fruit is conveyed to a coring device which I have schematically indicated. This coring device is simply a rotating tube about one inch or so in diameter and the fruit is pushed down over the tube and the core cut out. Most of the seeds come away with the core. The cores contain a small quantity of juice which is worth recovering and these cores can be passed through a juice finisher or extractor which crushes the core and separates the juice from the insoluble core fragments.

The cored fruit then passes along to where it is cut in half in a direction transverse the core and then these halved portions are "everted" or turned inside-out. Since the fruit peel or rind has been softened it is possible to turn the half inside-out thus expanding the meat and loosening much of the meat from the rag separating the segments of the fruit. This likewise aids in the removal of a portion of the meat as whole cells. Any seeds remaining in the fruit at this stage can be shaken out.

These everted halves are then subjected to a de-celling operation. One suitable device for this purpose consists of a rotating wheel which I have illustrated in Figure 4. This wheel is a few inches in diameter (about 7 inches) and has radially-spaced, U-shaped elements made of piano wire which is somewhat flexible. The everted halved fruit is held against this rotating de-celling element in such a manner that the meat is scraped away from the rind. A rotational speed of about 100 R. P. M. is satisfactory. Figure 5 shows an everted grapefruit held against the wire members of the rotating de-celling device, the meat being scraped out from the rind in a direction perpendicular to the edge of the fruit collars and parallel to the partition walls of the segments. The character of the device is such as to subject the meat to a disintegrating force which acts differentially in different areas of the meat simultaneously to expand and extract a substantial portion of the individual meat cells intact and to rupture the other meat cells to release their juice and expand and extract such ruptured cells.

During the de-celling operation about two-thirds of the whole cells are ruptured and about one-third of the whole cells are removed intact under many conditions, but depending upon variations in the fruit and the skill of the operator the ratio of whole cells to ruptured cells may run from 1:1 to 1:4. Since, because of the rupturing of the whole cells, the juice content therein is liberated, the mixture flowing from the de-celling operation consists of a mass of juice, intact individual whole cells and individual ruptured cells. This mass flows on to a shaking screen having openings sufficient to permit the juice to pass through but to retain the mixture of whole cells and ruptured cells. A stainless steel screen with ⅛" openings is satisfactory for this purpose.

As the mass flows over the screen operatives pick out whatever seeds and pieces of rag have come through the de-celling operation. After the screening operation the juice is collected in a suitable container, as shown, beneath the screen and the mixture of whole cells and ruptured cells is collected in another container. Due to the shaking action and gravity feed over the screen this mixture of cells is caused to flow from the screen into the container.

I now have citrus fruit juice, such as grapefruit juice, and a mixture of grapefruit whole cells and ruptured cells having the physical characteristics I have elaborated on above. From this point on much variation can take place. In the simplest form of my invention I simply recombine juice and cell mixture in the proportions I desire. The separation of the juice from the cells enables their quantities to be accurately determined. The quantity of juice in the fruit varies at different times of the growing season and without separation and re-combination in controlled proportions the ratio of cells to juice in the product could not be maintained uniform at all times. These proportions will be such that the apparent volume of the mixture in a container confining it is substantially occupied by whole cells and ruptured cells with the juice filling the interstices. For most purposes a ratio of one part by volume of juice and one part by apparent volume of cell mixture is satisfactory. With variations in the ratio of whole cells to ruptured cells of from 1:4 to 1:1 the mixed product would include 50% juice, from 10% to 25% whole cells and from 40% to 25% ruptured cells. However, these proportions of juice to cells are subject to variation and one can readily determine by simple test how much juice and how much cell mixture to combine to give a final product in which there is substantially no segregation of cell-free juice either above or below the apparent volume of the cell mixture. "Apparent" volume is, of course, a well-understood term. It means the volume a mass of irregularly shaped solids appears to occupy.

Alternatively, the juice can be sweetened by the addition of sugar thereto before admixture with the cells. Mixtures of orange juice and grapefruit juice can be combined with mixtures of grapefruit cells and orange cells in proportions desired to meet the fancy of the consumer. In any event, I admix juice and cells and then pass this mixture through any suitable pasteurizing device which is no part of the present invention. This pasteurizing device is the same as that customarily used for the pasteurization of citrus fruit juices and the pasteurizing conditions are substantially identical with those hitherto used for the pasteurization of ordinary citrus juice. Pasteurization is no part of the present invention apart from its use in the process as a normal requirement in the finishing of citrus fruit products. However, the heat of pasteurization may advantageously affect the stability of the mixture if it promotes rapid equalization of the osmotic pressure relationships between whole cells and the outer juice phase.

It will be apparent to those skilled in the art that osmotic pressure relationships may play some part in maintaining the stability of the final product so that no substantial separation of a clear fluid layer occurs. Thus, if sweetened juice is admixed with whole cells the sugar content of the juice in the outer phase is higher than that of the juice within the whole cell and therefore there will be some tendency for water to pass through the cell sac into the surrounding sweetened juice so that the sugar content of the outer juice and that within the whole cell is equalized. This osmotic pressure effect tends to equalize the specific gravity of the whole cells and the surrounding fluid.

After pasteurization the mixture is conveyed to a can-filling machine and the cans closed in exactly the same manner as ordinary grapefruit and orange juice is handled. Or, if desired, the mixture can be packaged and frozen for sale as a frozen food article.

One of the marked advantages of my process is in the fact that much of the juice handling is similar to that used in the processing of ordinary orange or grapefruit juice. Canning, pasteurizing, etc., are the same.

In my co-pending application Serial No. 697,969 filed September 19, 1946, of even date herewith, I have more fully described and claimed the products of the present invention.

In Figure 2 I show the average form of a whole cell and the average form of a limpid ruptured whole cell. As stated, I deliberately maintain the normal, intact physical structure of the whole cells and the ruptured cells as much as possible, and this is substantially complete. I deliberately avoid any breakdown of the ruptured cells so that they are torn in half or otherwise broken down into insoluble cell fragments of much smaller particle size than the original cells. My process of de-celling the meat permits me to achieve this result, since, as stated, I de-cell in a way which permits the meat to be disintegrated to expand the individual cells and with the general form of the cells maintained intact, in contrast with the destructive burring hitherto used in fruit processing. Figure 3 shows in cross-section a container in which the apparent volume of the mixture of juice and cells is occupied by the cells with the juice filling the interstices between the cells.

My process can be used for the processing of any citrus fruit, and I do not wish to be limited to grapefruit. Oranges, lemons and limes can be treated in precisely the same way.

Nor do I wish to be limited to the particular process steps herein described. The steam and hot water jet preliminary treatment can be omitted although I find there is some advantage in first cleaning the fruit and softening it in this way. Other devices for de-celling the meat segments (as contrasted with the drastic burring operations, of the past) can be devised.

Having thus described my invention, what I claim is:

1. The process of preparing a citrus fruit product which comprises disintegrating the meat segments of citrus fruit into small components with rupture of only a portion of the meat cells and preservation of a substantial further portion of the meat cells of the fruit intact and containing their juice, and forming the disintegrated small meat components of ruptured and intact cells and citrus fruit juice into a mixed product.

2. The process of preparing a citrus fruit product which comprises disintegrating the meat segments of citrus fruit into small components with rupture of only a portion of the meat cells and preservation of a substantial further portion of the meat cells of the fruit intact and containing their juice, separating the disintegrated small meat components of ruptured and intact cells from the citrus fruit juice of the ruptured cells, and admixing the small meat components with citrus juice.

3. The process of preparing a citrus fruit product which comprises disintegrating the meat segments of citrus fruit into small components with rupture of only a portion of the meat cells and preservation of a substantial further portion of the meat cells of the fruit intact and containing their juice, separating the disintegrated small meat components of ruptured and intact cells from the citrus juice of the ruptured cells, sweetening the citrus juice to prepare it for admixture with disintegrated small meat components, and admixing the small meat components with sweetened citrus juice.

4. The process of preparing a citrus fruit product which comprises disintegrating the meat segments of citrus fruit into small components with rupture of only a portion of the meat cells and preservation of a substantial further portion of the meat cells of the fruit intact and containing their juice, separating the disintegrated small meat components of ruptured and intact cells from the citrus juice of the ruptured cells, sweetening the citrus juice to prepare it for admixture with disintegrated small meat components, and recombining the small meat components with at least a portion of the sweetened citrus juice.

5. The process of preparing a citrus fruit product which comprises expanding the meat of citrus fruit to loosen the meat cells from their normal compacted state, disintegrating the expanded meat into small components with rupture of only a portion of the meat cells and preservation of a substantial further portion of the meat cells of the fruit intact and containing their juice, and forming the disintegrated small meat components of ruptured and intact cells and citrus fruit juice into a mixed product.

6. The process of preparing a citrus fruit product which comprises coring the fruit, halving the fruit transverse the core, everting the halved fruit, disintegrating the meat thereof into small components with rupture of only a portion of the meat cells and preservation of a substantial further portion of the meat cells of the fruit intact and containing their juice, and forming the disintegrated small meat components of ruptured and intact cells and citrus fruit juice into a mixed product.

7. The process of preparing a citrus fruit product which comprises softening the peel of the fruit, coring the fruit, halving the fruit transverse the core, everting the halved fruit, disintegrating the meat thereof into small components with rupture of only a portion of the meat cells and preservation of a substantial further portion of the meat cells of the fruit intact and containing their juice, and forming the disintegrated small meat components of ruptured and intact cells and citrus fruit juice into a mixed product.

8. The process of preparing a citrus fruit product which comprises disintegrating the meat segments of citrus fruit into small components with rupture of only a portion of the meat cells and preservation of a substantial further portion of the meat cells of the fruit intact and containing their juice, and forming the disintegrated small meat components of ruptured and intact cells and citrus fruit juice comprising the juice of said ruptured cells into a mixed product.

9. The process of preparing a citrus fruit product which includes extracting a portion of the meat from citrus fruit as separated and intact individual cells containing their juice and simultaneously rupturing the other meat and extracting the same as separated and ruptured individual cells and the juice therefrom, and forming the intact and separated intact and ruptured cells and the juice of the ruptured cells into a homogeneous mixed product.

10. In the processing of citrus fruit the step of subjecting the citrus fruit to a disintegrating force acting differentially in different areas of the meat simultaneously to separate and extract a substantial portion of the individual meat cells intact and containing their juice and to rupture the other meat cells to release their juice and separate and extract such ruptured cells.

11. The process of preparing a citrus fruit product which comprises subjecting the citrus fruit to a disintegrating force acting differentially in different areas of the meat simultaneously to separate and extract a substantial portion of the individual meat cells intact and containing their juice and to rupture the other individual meat cells to release their juice and separate and extract such ruptured cells, and forming a homogeneous mixed product comprising the substantially individualized intact and ruptured cells in the juice of the ruptured cells.

12. The processing of citrus fruit which includes disintegrating the meat of citrus fruit and extracting intact meat cells containing their juice from the citrus fruit simultaneously with extraction and rupture of the fruit to release their juice of other meat cells, the whole cells constituting not less than 20% of the total number of cells, and forming a fruit product comprising the whole cells and ruptured cells in citrus juice.

JOHN A. BRUCE.

REFERENCES CITED

The following references are of record in the file of this patent:

UNITED STATES PATENTS

| Number | Name | Date |
| --- | --- | --- |
| 1,236,382 | Von Epler | Aug. 17, 1917 |
| 1,601,027 | Lefevre | Sept. 28, 1926 |
| 2,190,991 | Meinzer | Feb. 20, 1940 |
| 2,199,345 | Polk et al. | Apr. 30, 1940 |
| 2,318,178 | McKinnis | May 4, 1943 |
| 2,357,895 | Higby | Sept. 12, 1944 |

OTHER REFERENCES

Publication by the U. S. Dept. of Agriculture, Dept. Circular 232, article entitled "By-Products From Citrus Fruits" by E. M. Chace, pages 1 to 4.